Patented Aug. 17, 1948

2,447,419

UNITED STATES PATENT OFFICE 2,447,419

PREPARATION OF DIPHENYLACETONITRILE

Jack Mills, Indianapolis, Ind., assignor to Eli Lilly and Company, Indianapolis, Ind., a corporation of Indiana No Drawing. Application August 11, 1947, Serial No. 768,061

8 Claims. (Cl. 260—465)

This invention relates to organic nitriles and is directed to a process of preparing diphenylacetonitrile.

It is known that diphenylacetonitrile may be prepared by a process involving the conversion of diphenylacetic acid to its corresponding acyl halide, thence to its amide, and finally, by reaction with phosphorus pentoxide to the desired diphenylacetonitrile. This process not only involves a multiplicity of steps but also requires as a starting material the relative expensive diphenylacetic acid.

An object of my invention is to provide a process of producing diphenylacetonitrile which uses inexpensive and readily available starting materials. A further object is to produce diphenylacetonitrile in good yield by a direct and efficient process which requires few individual steps. Additional objects will become apparent from the disclosure herein made.

In accordance with my invention diphenylacetonitrile is produced by condensing benzaldehyde with hydrogen cyanide to produce benzaldehyde cyanohydrin, and condensing the benzaldehyde cyanohydrin with benzene by treatment with boron trifluoride or an addition complex thereof.

The reactions involved in my synthesis may be represented by the following equations:

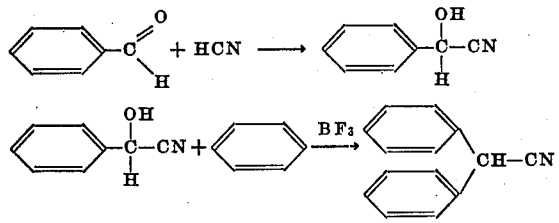

If desired, the benzaldehyde cyanohydrin may be prepared separately and then reacted with benzene to produce the diphenylacetonitrile, but I have found it convenient to cause the reaction among benzaldehyde, hydrogen cyanide and benzene, to proceed in a single reaction process to produce diphenylacetonitrile. This I do by mixing benzaldehyde, hydrocyanic acid and benzene together, and subjecting the mixture to the action of boron trifluoride, whereupon the reagents interact, presumably with the intermediate formation of benzaldehyde cyanohydrin, and diphenylacetonitrile is produced.

The process wherein the benzaldehyde cyanohydrin is produced separately and is subsequently reacted with benzene, may be carried out as follows: One equivalent of benzaldehyde is reacted with about one equivalent of hydrogen cyanide whereby benzaldehyde cyanohydrin is produced. The benzaldehyde cyanohydrin thus obtained is not isolated and purified, although such may be done, but the crude material is dissolved directly in benzene and treated with boron trifluoride. If desired, the boron trifluoride may be used in combination, for example, as an addition complex such as boron trifluoride etherate. The boron trifluoride causes the condensation of the benzene with the benzaldehyde cyanohydrin to produce the desired diphenylacetonitrile. The diphenylacetonitrile is isolated in any convenient manner as by treating the reaction mixture with water, separating from the aqueous phase containing the dissolved boron trifluoride the organic benzene phase containing the dissolved diphenylacetonitrile, and removing the benzene as by evaporation or distillation. The residue of diphenylacetonitrile may then be purified as by distillation or recrystallization.

The reaction between the benzaldehyde and the hydrogen cyanide to form benzaldehyde cyanohydrin is a known reaction. For the purposes of this invention this reaction preferably is carried out by adding the benzaldehyde to liquid hydrogen cyanide. Preferably, also, there are present in the hydrogen cyanide small amounts, i. e., of the order of about one percent or less, of benzaldehyde cyanohydrin and/or an aqueous solution of sodium cyanide. The presence of these latter reagents aids in the immediate starting of the exothermic reaction of the hydrogen cyanide with the benzaldehyde and eliminates the danger of a delayed, runaway reaction which might cause a substantial volatilization of the highly poisonous hydrogen cyanide. This preferred method gives good yields, and produces a reaction product which may be used directly for the preparation of the desired diphenylacetonitrile, without intermediate purification.

The reaction between the benzaldehyde and the hydrogen cyanide and also the reaction between the benzaldehyde cyanohydrin and the benzene may be effected over a wide range of temperatures. I have found that the rate of reaction as carried out at room temperature is satisfactory, although I prefer to use a reaction temperature above room temperature in order to increase the rate of reaction. Temperatures which I have found particularly suitable range from about 35° C. to about 40° C. for the reaction between the benzaldehyde and the hydrogen cyanide, and range from about 60° C. to about 70° C. for the reaction between the benzaldehyde cyanohydrin and the benzene. Since both of the reactions are exothermic in character, the temperature of the reaction mixtures readily may be regulated by the rate of addition of the reactants and the application of any commonly used external cooling means. An efficient cooling means permits a more rapid addition of the reactants and thus appreciably shortens the length of time required for the completion of the reaction.

The preferred process wherein the diphenylacetonitrile is produced in a single process step may be carried out as follows:

Approximately equivalent amounts of benzaldehyde and hydrogen cyanide are mixed with about one or two equivalents of benzene, and the mixture is treated with one equivalent or thereabouts of boron trifluoride. During the addition of the boron trifluoride, the diphenylacetonitrile is produced. The diphenylacetonitrile may be isolated from the reaction mixture by suitable methods as mentioned hereinabove.

The reaction desirably is carried out with external cooling in order to reduce the time required for the addition of the boron trifluoride. I prefer to have the mixture of reagents cooled to about 0° C. before adding the boron trifluoride and to add the latter at such a rate that the temperature of the reaction mixture has risen to about 75° C. or 85° C. when all of the boron trifluoride has been added. It will be understood of course that an efficient reflux system should be used during the addition of the boron trifluoride to prevent loss of the highly volatile hydrocyanic acid (hydrogen cyanide).

It is advantageous to have the benzene and hydrocyanic acid present in slight excess to insure reaction of all of the benzaldehyde. However, any excess benzaldehyde remaining in the reaction mixture is readily removed by washing the reaction mixture with aqueous sodium bisulfite solution.

The boron trifluoride used in the above-described reactions may be added in uncombined state, as a gas, or may be used in the form of an addition complex. Addition complexes suitable for the purposes of this invention include the etherates of boron trifluoride, illustrative examples of which are boron trifluoride ethyl etherate and boron trifluoride diisopropyl etherate, both of which are liquid under ordinary conditions. Addition complexes of boron trifluoride may dissociate, and thus release boron trifluoride.

This invention is further illustrated by the following examples which set forth in detail my present preferred methods of producing diphenylacetonitrile:

Example 1

To a mixture of 1.07 kg. (1.1 equivalents) of liquid hydrogen cyanide, 10 cc. of a saturated aqueous solution of sodium cyanide, and 10 g. of benzaldehyde cyanohydrin, 3.82 kg. (1 equivalent) of benzaldehyde are added with stirring, with external cooling with ice and water, and at such a rate that the temperature of the reaction mixture is about 30° C. during the first part of the addition and is about 50° C. when all of the benzaldehyde is added. The cooling means is then removed and the reaction mixture stirred for about 30 minutes in order to complete the reaction. To the mixture are then added 11 kg. (4 equivalents) of benzene, and boron trifluoride is passed into the solution at such a rate that the temperature is maintained at about 50–70° C. and until a total of about 3.15 kg. (1.5 equivalents) of boron trifluoride is added. During the reaction the mixture is cooled to permit a rapid addition of the boron trifluoride and to maintain the temperature within the preferred range. The reaction mixture is then poured into about 12 kg. of water, the resulting mixture allowed to separate into layers, and the supernatant layer containing the diphenylacetonitrile in solution is separated from the aqueous layer which contains the boron trifluoride. The benzene solution is washed with 3 liters of a 5 percent solution of sodium carbonate to remove hydrogen cyanide and any other acidic substances present and is then washed with 3 liters of water. The benzene is evaporated and the residue of diphenylacetonitrile is distilled in vacuo. It boils at about 140° C. at 2 mm. pressure and solidifies upon cooling. It melts upon heating to about 74–75° C.

The yield of diphenylacetonitrile thus obtained corresponds to about 80 percent of theory, based on the amount of benzaldehyde used.

Example 2

106 parts by weight (1.0 equivalent) of benzaldehyde, 35 parts by weight (1.3 equivalents) of hydrocyanic acid and 117 parts by weight (1.5 equivalents) of benzene are mixed and cooled to about 0° C., and 75 parts by weight (1.1 equivalents) of boron trifluoride are passed into the mixture at such a rate that the temperature of the reaction mixture when all of the boron trifluoride is added, is about 85° C. The liquid reaction mixture is allowed to stand at room temperature for about four hours and is then washed successively with two portions of water, two portions of 10 percent aqueous sodium bisulfite solution and two portions of water, the volume of each wash portion being about equal to the volume of the reaction mixture. The reaction mixture is then heated under vacuum to remove excess benzene and the hot concentrate is poured with stirring into about 80 parts by weight of extraction naphtha whereupon the diphenylacetonitrile separates in crystalline form. The mixture is cooled to about 0° C. to insure thorough separation of the diphenylacetonitrile crystals, and filtered. The crystalline residue of diphenylacetonitrile is purified by recrystallizing it from about 200 parts by weight of a mixture of equal parts of ethanol and extraction naphtha. Diphenylacetonitrile in crystalline form is obtained in a yield upwards of 80 percent.

Alternatively, the diphenylacetonitrile may be recovered from the reaction mixture by the process described in Example 1.

This is a continuation-in-part of application Serial No. 683,783, filed July 15, 1946.

I claim:

1. In the process of producing diphenylacetonitrile the step which comprises reacting benzaldehyde cyanohydrin with benzene in the presence of a member of the group consisting of boron trifluoride and its etherates.

2. The process step according to claim 1 in which the benzaldehyde cyanohydrin is formed in the presence of the benzene and a member of the group consisting of boron trifluoride and its etherates.

3. The process step according to claim 1 in which the benzaldehyde cyanohydrin is prepared separately.

4. In the process of producing diphenylacetonitrile the step which comprises dissolving benzaldehyde cyanohydrin in benzene and subjecting the mixture to the action of boron trifluoride whereby the benzaldehyde cyanohydrin and benzene are caused to interact.

5. The process of producing diphenylacetonitrile which comprises reacting benzaldehyde cyanohydrin with benzene by treating a solution of benzaldehyde cyanohydrin in benzene with a member of the group consisting of boron trifluoride and its etherates, treating the reaction mixture with water and recovering the diphenylacetonitrile.

6. In the process of producing diphenylacetonitrile, the step which comprises subjecting a mixture of benzaldehyde, hydrogen cyanide and benzene to the action of boron trifluoride.

7. The process of producing diphenylacetonitrile which comprises treating a mixture comprising one equivalent of benzaldehyde, about one equivalent of hydrogen cyanide and about one and one half equivalents of benzene, with about one equivalent of a member of the group consisting of boron trifluoride and its etherates, and recovering the diphenylacetonitrile.

8. The process of producing diphenylacetonitrile which comprises reacting one equivalent of benzaldehyde with about one equivalent of hydrogen cyanide to form benzaldehyde cyanohydrin, adding several equivalents of benzene, passing into the mixture about one and one half equivalents of boron trifluoride whereby the benzene is caused to react with the benzaldehyde cyanohydrin, treating the reaction product with water to cause solution of the boron trifluoride in the aqueous phase and separating and evaporating the benzene phase to recover the diphenylacetonitrile.

JACK MILLS.